June 24, 1969  T. B. RUSSELL  3,451,446
LIQUID MEASURING DISPENSER
Filed April 23, 1968
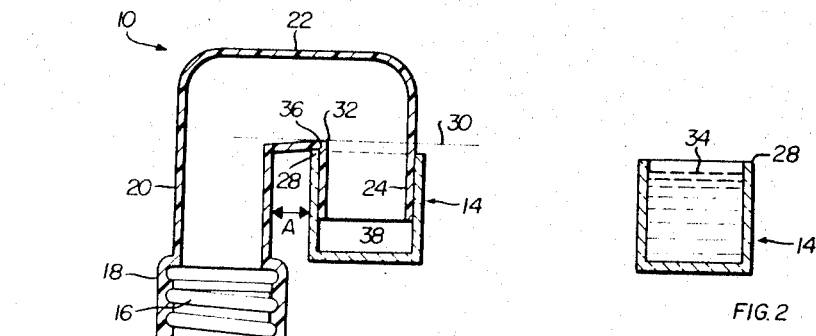
FIG. 1
FIG. 2
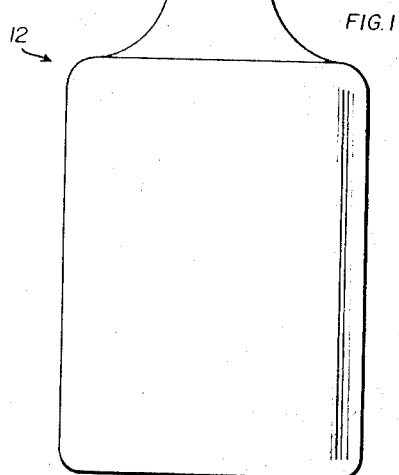
FIG. 3
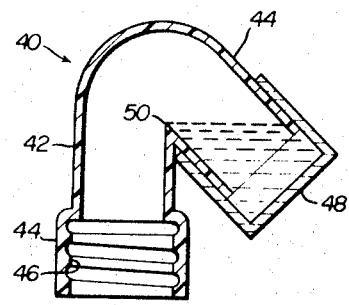
FIG. 4
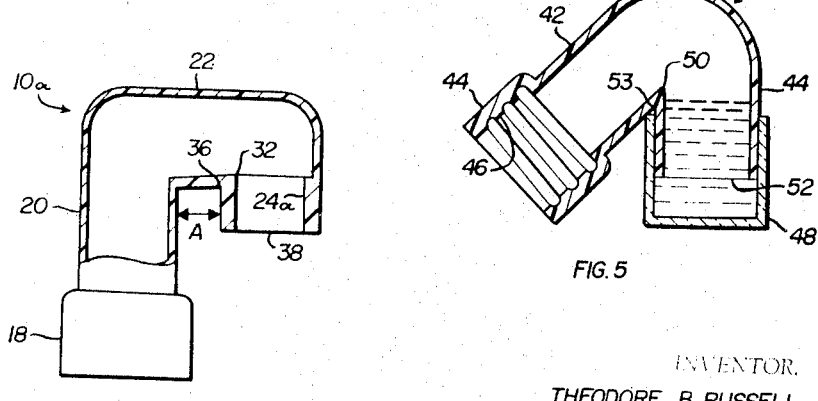
FIG. 5
INVENTOR.
THEODORE B. RUSSELL.
BY John H. Oltman
ATT'Y.

United States Patent Office 3,451,446
Patented June 24, 1969

3,451,446
LIQUID MEASURING DISPENSER
Theodore B. Russell, 2190 NE. 124th St.,
North Miami, Fla. 33161
Filed Apr. 23, 1968, Ser. No. 723,542
Int. Cl. B65b *39/00, 3/30*
U.S. Cl. 141—319     5 Claims

ABSTRACT OF THE DISCLOSURE

An improvement in a liquid measuring and dispensing device including a tubular element having a first leg shaped to be detachably connected with the neck of a bottle and a second leg to be detachably connected with a cup with the second leg fitting inside the cup, the improvement lying in the dimensioning of the length, thickness and inside diameter of the second leg to displace a predetermined amount of liquid from the cup when liquid has been dispensed to the cup so that the amount of liquid left in the cup and second leg will only partially fill the cup when the cup is removed from the second leg leaving a consistent desired portion of the cup unfilled.

Background of the invention

This invention is an improvement on a liquid measuring dispenser described and claimed in U.S. Patent No. 2,768,660 issued to the present inventor on Oct. 30, 1956. In that patent the measuring and dispensing device is a U-shaped tubular element or elbow with one leg for connection to the neck of a bottle and another leg for detachable connection to a cup. The bottle may contain medicine such as cough medicine, liquor or the like. A measured amount of liquid is dispensed to a cup when it is connected to the second leg of the tubular element by inverting the bottle and then returning it to an upright position. It has been found, however, that if the dispenser is constructed in accordance with any of the embodiments of the patent, the amount of liquid remaining in the cup and second leg just after the bottle is inverted and returned is always sufficient to fill the cup right to its brim when the cup is removed from the second leg. Thus, although the cup may not overflow so long as it is perfectly upright, it is much too full and liquid can easily be spilled in the process of carrying the cup to the mouth.

Summary of the invention

In accordance with the present invention, the dispensing device includes a tubular element which may be U-shaped or V-shaped having an angularly directed first leg shaped to be detachably connected with the neck of a bottle, and an angularly directed second leg which fits inside a cup and which has a length, thickness and inside diameter making the volume of the second leg sufficient to displace a predetermined amount of liquid from the cup so that the amount of liquid left in the cup and second leg immediately after a dispensing operation can only partly fill the cup when the cup is removed from the second leg. The dispenser and cup can be dimensioned to provide one standard teaspoon of liquid in the cup each time the bottle is inverted and returned and the cup removed with the surface of the liquid always being a desirable distance below the rim of the cup. Thus, the liquid can be dispensed and transferred to the mouth of the user without spillage.

It is an object of the present invention to provide an improved liquid measuring and dispensing device whereby a measured amount of liquid can be delivered to a cup without filling the cup too full.

Another object of the invention is to improve on a liquid measuring dispenser without complicating it or making it difficult or uneconomical to manufacture.

A further object of the invention is to compensate for liquid contained in the delivery end of a dispenser of the type discussed above so that when the cup is removed from the dispenser, it will only be partly filled leaving a desired portion of the cup unfilled.

Other objects of this invention will appear in the following description and appended claims, reference being had to the accompanying drawings forming a part of this specification wherein like reference characters designate corresponding parts in the several views.

On the drawings:

FIGURE 1 shows a bottle with a U-shaped liquid measuring dispenser and cup applied thereto, the dispenser being in accordance with one embodiment of the invention;

FIGURE 2 is a sectional view of the cup consistently desirably filled with liquid after it has been removed from the dispenser;

FIGURE 3 is an elevational view, partly in section, of a dispenser in accordance with another embodiment of the invention;

FIGURE 4 is a sectional view of another embodiment wherein the dispenser is V-shaped; and FIGURE 5 is a sectional view showing the dispenser of FIGURE 4 tilted so that the cup is upright.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

A liquid measuring and dispensing device 10 is shown in FIGURE 1 as applied to a bottle 12, with a cup 14 attached to the dispenser. The dispenser 10 is particularly well suited for use with a standard six to eight ounce liquid pharmacists medicine bottle of the type in which cough medicines are supplied. Such bottles have standard size threads 16 to which the internally threaded cap portion 18 of the dispenser can be screwed. Also the popular brands of pharmaceutical manufacturer's cough medicines use bottles with caps of this same threading.

The dispenser 10 is an inverted U-shaped tubular element having a first leg 20, of which cap 18 is a part, to be detachably connected to the neck of bottle 12. Although cap 18 is desirably an integral part of leg 20, the cap may be a separate piece connected to leg 20 in the manner shown in FIGURE 12 of the aforementioned patent. Optionally, the bottom of leg 20 may be straight and sufficiently yieldable to clip tightly over the neck of a bottle without screwing it on.

Adjacent leg 20 is an intermediate portion 22 of the dispenser which is positioned generally horizontally but in a slightly pitched position by leg 20 when it is applied to a bottle. The pitch of intermediate portion 22 may be approximately 5 degrees from a horizontal reference by way of example. The purpose of the pitch of intermediate portion 22 is to facilitate draining of liquid back into the bottle 12 after liquid has been dispensed from the bottle, as will be described further.

Adjacent intermediate portion 22 is a second leg 24 extending vertically when the dispenser is applied to a bottle. Legs 20 and 24 are obviously angularly directed relative to intermediate portion 22 such that the dispenser 10 is generally U-shaped. The second leg 24 is shaped to fit inside a measuring cup 14 which may be made of plastic or glass. If cup 14 is made of pliable polyethelene plastic, it may be dimensioned to fit snugly around the outside of leg 24 to provide a liquid tight fit. A tight fit may also be achieved when cup 14 is made of glass, but the tolerances must be closer.

It may be seen in FIGURE 1 that cup 14 is applied to the dispenser such that its rim 28 butts up against the under surface of intermediate dispenser portion 22. Second leg 24 then extends a substantial distance into cup 14.

Liquid is dispensed from the bottle 12 with the dispenser and cup applied to it by first inverting the bottle and then returning it to an upright position. The bottle should be turned toward the cup in this inverting operation. When the bottle is inverted, liquid fills both the dispenser 22 and the cup 14. Then, when the bottle is returned to an upright position, liquid drains back into the bottle from intermediate portion 22 and first leg 20. This leaves enough liquid inside cup 14 and second leg 24 to fill the second leg up to the level of the broken line 30 which is at the corner 32 at the top of second leg 24 where leg 24 joins intermediate portion 22.

If the second leg 24 did not extend a substantial distance into cup 14, it is apparent that upon removal of the cup from the dispenser, the liquid would fill the cup right up to its brim. However, second leg 24 as shown in FIGURE 1 has a length, thickness and inside diameter making the volume of the second leg sufficient to displace a predetermined amount of liquid from cup 14 so that when cup 14 is removed from dispenser 10, the remaining liquid cannot completely fill the cup. This is shown in FIGURE 2 wherein it may be seen that the surface 34 of the liquid in cup 14 is a substantial distance below the rim 28 of the cup.

By way of example, dimensions will be given for the embodiment of FIGURE 1. The inside diameter of leg 24 may be ⅝ of an inch, and the outside diameter may be ¾ of an inch, the wall thickness of leg 24 being ¹⁄₁₆ of an inch. The length of leg 24 measured from corner 36 to rim 38 is ½ inch. The cup 14 for use with this embodiment of the dispenser may have an inside height of ¾ of an inch, inside diameter of ¾ of an inch and a wall thickness of ¹⁄₁₆ of an inch throughout. With these dimensions, each time the bottle is inverted and returned to an upright position, dispenser 10 will deliver one standard teaspoon of liquid to cup 14. After the cup is removed from the dispenser, surface 34 of the liquid therein will be ¹⁄₁₆ of an inch below the rim 28 of the cup.

FIGURE 3 shows a slightly modified embodiment of the invention. This embodiment is similar to that of FIGURE 1, so the same reference numerals are applied to like parts. The only difference is that the second leg 24a of the dispenser has different dimensions. In this embodiment, the inside diameter of leg 24a is ½ inch, and the outside diameter of leg 24a is ¾ of an inch, the wall thickness thereof being ⅛ of an inch. By increasing the wall thickness to ⅛ of an inch in this manner, the length of leg 24a measured from corner 36 to rim 38 may be shortened to ⅜ of an inch instead of ½ inch as in FIGURE 1. The same cup 14 may be used with the embodiment of FIGURE 3, and the device will dispense one teaspoon of liquid to the cup and leave the surface of the liquid ¹⁄₁₆ of an inch from the top of the cup when it is removed from the dispenser, exactly as described in connection with the embodiment of FIGURE 1. The dispensers 10 and 10a may both have a wall thickness of ¹⁄₁₆ of an inch throughout, except for a wall thickness of ⅛ of an inch in leg portion 24a as shown in FIGURE 3. The distance from first leg 20 to second leg 24 as indicated at A may be ⁵⁄₁₆ of an inch. It is obvious that when a 2 teaspoon equivalent dosage is prescribed, the one teaspoon capacity cup can very readily be provided by filling said cup twice. Furthermore by providing a cup 1⁷⁄₁₆ inch in depth, a two teaspoon equivalent will result.

The dispensers 10 and 10a may both be made of plastic. They may originally be molded in halves which may be joined together in the manner described in the aforementioned patent.

FIGURES 4 and 5 illustrate another embodiment of the invention in which the dispenser 40 is V-shaped rather than U-shaped. Dispenser 40, as a result of its V-shape, can be made in one piece by injection molding of plastic.

Dispenser 40 is a tubular element which includes a first leg 42 and a second leg 44, the two legs preferably being at an angle of about 45 degrees with respect to each other. First leg 42 includes a cap 44 with internal threads 46 adapted to be screwed on to standard threads of a six to eight ounce medicine bottle or other container. Optionally, the bottom of leg 42 can be made straight and sufficiently yieldable to slip tightly on to the neck of a bottle without screwing it on.

Second leg 44 is shaped to fit inside a cup 48 which may be made of plastic or glass. As in the embodiment of FIGURE 1, the cup 48 may be made of pliable plastic which will yield very slightly when the cup is put on leg 48 to provide a liquid tight fit. The fit should not be so tight as to make it difficult to remove the cup.

When dispenser 40 is applied to a bottle with the cup on the dispenser, liquid is dispensed by inverting the bottle and returning it to an upright position. Again, the bottle should be turned toward the cup in this inverting operation. After liquid has been dispensed and the bottle returned upright, liquid fills the cup and second leg 44 up to the level of the corner 50 as shown in FIGURE 4. In order to remove the cup, the bottle must next be tilted to position the cup upright as shown in FIGURE 5. The liquid level will then be somewhat below corner 50 as shown in FIGURE 5. Second leg 44 has a length, thickness and inside diameter making the volume of the second leg sufficient to displace a predetermined amount of liquid from cup 48, so that when cup 48 is removed from leg 44, the remaining liquid cannot completely fill the cup. The level of liquid in the cup when removed will be a substantial distance below the rim of the cup, and this condition is the same as that illustrated in FIGURE 2.

By way of example, the inside diameter of leg 44 may be ⅝ of an inch, its outside diameter ¾ of an inch and its wall thickness ¹⁄₁₆ of an inch. The length of leg 44 measured from corner 53 to rim 52 may be ⁹⁄₁₆ of an inch. The cup 48 should have an inside height of ⅞ of an inch, an inside diameter of ¾ of an inch and a wall thickness of ¹⁄₁₆ of an inch. Cup 48 is pushed on to leg 44 so that the rim of the cup contacts leg 42 just short of corner 53. With these dimensions, dispenser 40 will deliver one standard teaspoon of liquid to cup 48.

A slight modification of dispenser 40 may be made. If the bottle with dispenser 40 and cup 48 on it is inverted and then returned directly to a position wherein cup 48 is upright, the liquid will be level with the top of corner 50. Again, the bottle should be turned toward the cup when inverting it, and returned in the opposite direction. The cup can then be removed without first returning the bottle upright and then tilting it. However, this requires that leg 44 be made longer or thicker than described above to displace sufficient liquid so that there is only one teaspoon full of liquid in the second leg and cup, even though the liquid is level with corner 50. Then when the cup is removed, the surface of the liquid in it will be substantially below the rim of the cup like the condition shown in FIGURE 2.

The invention provides an improved measuring and dispensing device which is very easy to use, and which prevents spillage of liquid from the cup into which liquid is dispensed. In fact a blind person or person in total darkness can even in lying down position use this dispensing without spilling a drop. Also by returning the cup to the dispenser after first usage, same is kept sanitarily free from surrounding air, and in readiness for the next use. Finally, when convenient the cup can at anytime be flushed and cleansed periodically while medicine is needed; likewise after need for said medicine the whole dispenser can be flushed and scalded for future use.

Having thus described my invention, I claim:

1. In a liquid measuring and dispensing device comprising an elbow shaped tubular element having a first leg shaped to be detachably connected with the neck of a bottle so that the first leg extends upwardly, and a second leg communicating with the first leg and shaped to fit inside a cup, said second leg extending downwardly when said first leg is connected to a bottle so that liquid may be dispensed from the bottle to a cup on said second leg by inverting and returning the assembly of bottle, tubular element and cup, the improvement wherein said second leg has a length, thickness and inside diameter making the volume of said second leg sufficient to displace a predetermined amount of liquid from said cup when liquid has been dispensed from said bottle to said cup so that the amount of liquid left in said cup and second leg can only partially fill said cup when said cup is removed from said second leg, thereby consistently leaving a desired portion of said cup unfilled.

2. The liquid measuring and dispensing device of claim 1 in which said tubular element has a corner between said first and second legs from which liquid drains through said first leg back into said bottle upon inverting and returning said assembly so that the remaining liquid fills said cup and second second leg up to said corner.

3. The liquid measuring and dispensing device as claimed in claim 2 in which said second leg is straight from said corner to the end thereof so that the cup may be placed on said second leg with the rim thereof abutting the underside of said corner.

4. The liquid measuring and dispensing device as claimed in claim 3 in which said tubular element has an inverted U-shape when applied to said bottle.

5. The liquid measuring and dispensing device as claimed in claim 3 in which said tubular element has an inverted V-shape when applied to said bottle.

References Cited

UNITED STATES PATENTS 2,574,746  11/1951  Luther _____ 141—80
2,768,660  10/1956  Russell _____ 141—319

ROBERT B. REEVES, *Primary Examiner.*

H. S. LANE, *Assistant Examiner.*

U.S. Cl. X.R.
141—80; 222—454